United States Patent [19]
Taylor

[11] Patent Number: 5,084,900
[45] Date of Patent: Jan. 28, 1992

[54] SPREAD SPECTRUM SYSTEM WITH RANDOM CODE RETRANSMISSION

[75] Inventor: Desmond P. Taylor, Hamilton, Canada

[73] Assignee: GTE Spacenet Corporation, McLean, Va.

[21] Appl. No.: 454,345

[22] Filed: Dec. 21, 1989

[51] Int. Cl.$^5$ .............................................. H04L 27/30
[52] U.S. Cl. ............................................. 375/1; 370/18; 370/93; 455/12
[58] Field of Search ...................... 370/18, 60, 93, 94.1, 370/94.2, 94.3, 104.1; 455/12, 13; 375/1

[56] References Cited

U.S. PATENT DOCUMENTS

| | | | |
|---|---|---|---|
| 3,879,581 | 4/1974 | Schlosser et al. | 370/104.1 |
| 4,617,674 | 10/1986 | Mangulis et al. | 375/1 |
| 4,637,017 | 1/1987 | Assal et al. | 370/104.1 |
| 4,639,937 | 1/1987 | McRae et al. | 370/18 X |
| 4,688,216 | 8/1987 | Saburi | 370/104.1 |
| 4,742,512 | 5/1988 | Akashi et al. | 370/104.1 X |

FOREIGN PATENT DOCUMENTS 0112731 6/1984 Japan ...................................... 455/13

Primary Examiner—Bernarr E. Gregory

[57] ABSTRACT

A communication system includes a hub station and a plurality of terminal stations. An inbound satellite communication link from each of the terminal stations to the hub station sends digital data packets encoded with a CDMA code for code division multiple access during synchronized time slots on a contention channel. Each of the digital data packets is encoded with the same CDMA code during a first transmission, but each packet is encoded with an alternate CDMA code during any subsequent transmission.

1 Claim, 1 Drawing Sheet

SPREAD SPECTRUM SYSTEM WITH RANDOM CODE RETRANSMISSION

BACKGROUND OF THE INVENTION

This invention pertains to communication systems and more particularly is concerned with spread spectrum code division multiple access contention communication systems.

There are at present terminal networks which employ code division multiple access (CDMA) techniques. These networks, however, do not employ the concept of alternative code selection when packets have to be retransmitted.

There is a need for private satellite networks containing between 20 and about 300 terminals in communication with a common hub ground station. Code division multiple access (CDMA) spread spectrum techniques were first used in military systems because of the cost of their implementation. Further, the possibility has been raised of systems with spread spectrum techniques in combination with time slotted packet contention techniques such as that known as ALOHA.

SUMMARY OF THE INVENTION

Briefly, a communication system includes a hub station and a plurality of terminal stations. An inbound communication link from each of the terminal stations, to the hub station sends digital data packets encoded with a CDMA code for code division multiple access during synchronized time slots on a contention channel. Each of the digital data packets is encoded with the same CDMA code during a first transmission, but each packet is encoded with an alternate CDMA code during any subsequent transmission.

DESCRIPTION OF THE PREFERRED EMBODIMENTS

In keeping with the invention, code division multiple access (CDMA) spread spectrum techniques are used in satellite communication systems and networks, allowing the sharing of an inbound space segment in a non-interfering manner by a number of terminal earth stations belonging to several distinct networks, while at the same time avoiding the necessity for shared hub facilities. Each network includes a corresponding hub ground station.

Figure 1:
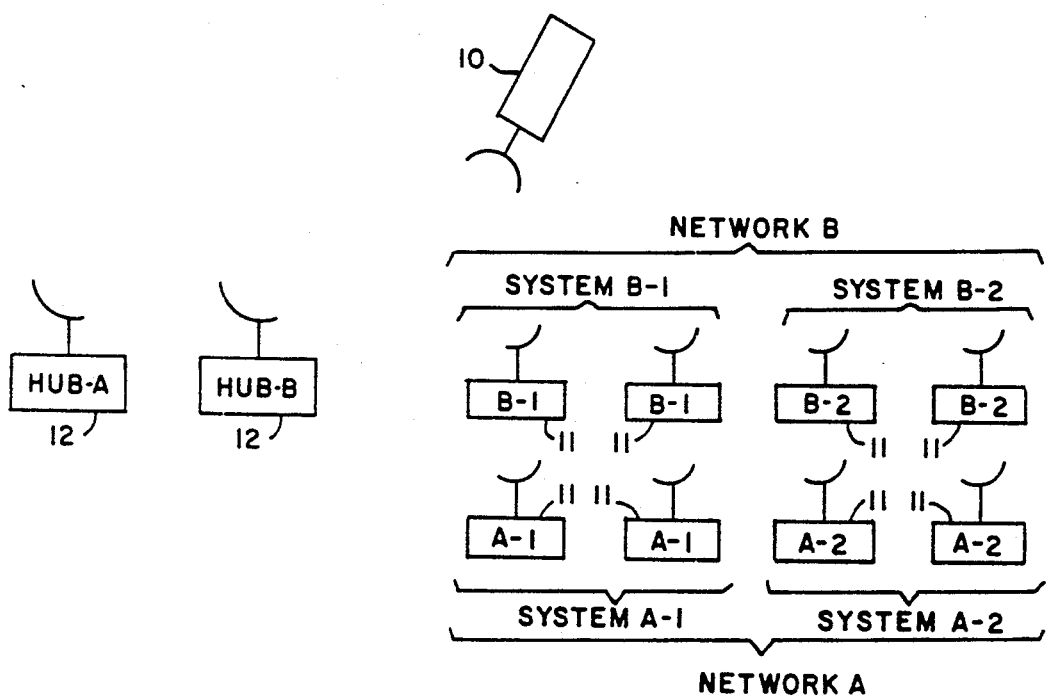
FIG. 1 is a diagram of a satellite system embodying the invention.
Figure 2:
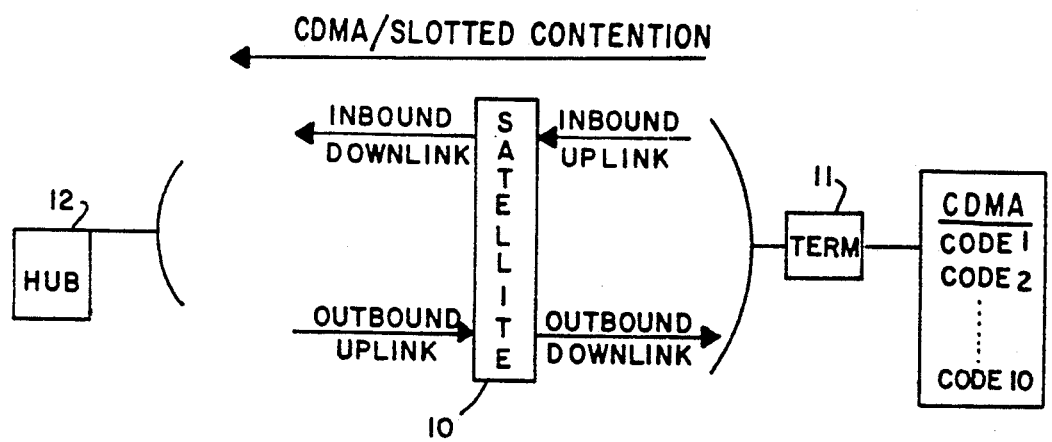
FIG. 2 illustrates the communication links between a hub and terminal of the system of FIG. 1.

Referring to FIG. 1, a space satellite 10 provides shared relay service for a plurality of distinct networks A, B. Each network includes a plurality of terminal ground stations 11 and a corresponding hub ground station 12. The terminal ground stations transmit packets to their respective hubs using the same inbound frequency bands. Each terminal ground station employs direct sequence spread spectrum transmission using a code in the form of a pseudorandom binary sequence, e.g. a Gold Code, to spread the spectrum of a data-modulated binary phase shift keyed (BPSK) signal. This results in a transmitted signal of the form:

$$s(t) = Ac(t)d(t)\cos \omega t$$

where $c(t)$ is a binary-valued waveform at rate $1/T_c$ representing the spread sequence and $d(t)$ is the binary-valued data waveform at rate $1/T$. In all cases, T is much greater than $T_c$. Also, the data waveform, $d(t)$, may include $r=\frac{1}{2}$, $K=7$ convolutional encoding. The ratio $T/T_c$ is known as the spreading factor or processing gain of the spread spectrum system.

A network, which is defined as a plurality of terminals coupled to a corresponding hub, may include several systems. All the terminals of a given system employ the same pseudo-random sequence code to spread their transmitted spectra. Different systems of a network use different codes, but share the same hub.

Each network has its own hub transmitting a time division multiplexed (TDM) outbound link at a bit rate higher than that of an inbound link. To meet FCC flux density limitations and to minimize the required antenna size at the terminals, some spectral spreading may be used in the outbound links from the hub. Despreading at the terminals may be accomplished using a corresponding baseband despreader.

In the inbound direction, from terminal to hub, each network utilizes a slotted contention multiaccess protocol, e.g. ALOHA. Slot synchronization is provided within each network; no attempt is made to synchronize slots among the different networks sharing the inlink. Collisions of packets within each individual system cause the destruction of all the colliding packets as the same spreading code is used. Each individual system can operate at a throughput of about 0.20 packets/slot, corresponding to an offered load of about 0.26 packets/slot. Because each individual system uses a different spreading code, collisions between the packets of different systems are not destructive but merely cause an increase in the effective ambient noise level. Thus as the number of systems sharing the inlink increases, performance degrades gracefully. For a spreading ratio of $T/T_c = 127$, between 5 and 10 distinct spreading codes or signature sequences can simultaneously occupy the bandwidth with less than 1 dB of performance degradation, assuming that all the signatures are present all the time and that $r=\frac{1}{2}$, $k=7$ convolutional encoding is employed. Because of the low per-system traffic load, between 15 and 20 small to medium size networks are able to share the inbound bandwidth. This number may be increased by increasing the spreading ratio.

In a CDMA environment, one of the more difficult problems is that of acquiring code synchronization at the receiver so that despreading and demodulation can be successfully accomplished. This usually requires a combination of a matched filter and code tracking loop. In the present case because of the slotted environment, code synchronization is inherent within each network as the code starts on the slot boundary. Therefore, the receivers at the hubs may be simple active correlators followed by phase shift demodulators. However, if there is large tolerance in the slot boundaries, matched filters may be needed.

The use of coherent phase shift keying on the inlinks maximizes the performance of the convolutional code, and therefore, as noted earlier, maximizes the multiple access capability of the overall inlink. This has the added benefit of allowing the minimization of the transmit power from the terminals.

As indicated above, each individual network employs a slotted contention protocol on the inlink to its hub. Each system of a network employs a unique nominal signature or spreading sequence, so that all other systems that share the frequency band appear as noise. This is further aided by the fact that each network is self-synchronous, but is asynchronous to all others. The overlap of two or more signals from terminals in the same system, and therefore having the same spreading code, appears as a collision. All packets involved in the collision will be lost and will have to be retransmitted. This hard collision can occur only among the packets belonging to a particular system. Collisions between packets from different systems, and therefore having different spreading codes, will lead only to a small increase in the ambient noise level and therefore, to a minor increase in the rate at which packets are corrupted by bit errors.

Provided the penalty due to the CDMA is a small (less than 1 dB), then the throughput of any of the N systems sharing the band may be expressed approximately as:

$$S = Ge^{-G} \text{ packets/slot}$$

where G is the offered load in packets per slot. This is the classical slotted ALOHA expression for throughput. On the other hand, if N systems, each with throughput S packets per slot and slot duration T, are occupying the band, then the overall channel utilization or throughput may be expressed as NS packets per slot-time. Because of the CDMA transmission format, this can be greater than one. If the per-system throughput is set at $S = 0.20$ and $NS = 5$, 25 systems may share the inlink bandwidth. Note that a system is a group of terminals that share a given spreading code as well as a shared hub. A given network may require more than one nominal spreading code, i.e., it may have too many terminals for one inbound channel. This may be accommodated by adding an additional receive chain at the hub for that network. However, each additional nominal spreading code is regarded as an additional system using the frequency band.

As a feature of the invention there is provided a pool of spreading codes for use by terminal nodes to retransmit packets that have been lost due to contention in the channel or that have been corrupted by noise. Random code access for retransmissions enhances network response time.

At the low data rates of the described terminal system, the slot duration tends to be long. For example if the data rate is $R_a = 4,800$ bps and there are 96 bytes in a packet, then the slot duration is $T_m = 160$ ms. If a standard slotted ALOHA retransmission scheme is used with randomization of time state over say $L = 8$ slots then following the timeout period, as much as 1.28 seconds of additional delay due to randomization may be experienced. Such delay may be avoided by using random code access on retransmission.

As indicated above, each system employs a nominal or home signature sequence for the initial transmission of each of its packets. In addition, each system may be provided with an additional pool of a plurality, say 10, of spreading codes to be used only for the retransmission of packets. When a terminal times out and has to retransmit a packet, CDMA code means makes a random choice of spreading sequence from the pool and immediately retransmits in the next slot, thereby avoiding the randomization delay. With a sufficiently low per-system throughput (say $S \sim 0.20$), this covers about 95% of the packets. If necessary, the same procedure may be followed on subsequent retransmissions.

EXAMPLE

Suppose that terminals transmit at a data rate of 4,800 bits/sec and that $r = \frac{1}{2}$, $K = 7$ convolutional encoding is employed. If each terminal transmission is spread by a factor of 127, each transmission is at a channel rate of 1,219,200 chips and a channel bandwidth of about 3 MHz will be required.

Further suppose that each terminal network consists of 100 terminals and that each such network operates at a throughput of $S = 0.20$ packets/slot, corresponding to an offered load of $G = 0.26$ packets/slot. If on average, there are 5 packets simultaneously in the channel from different networks, then the same channel can support approximately $N = 5/0.2 = 25$ simultaneous networks with an overall performance penalty of about $\frac{1}{2}$ dB in received E/N. This allows a channel to support an overall population of around 2,500 terminals.

It will be appreciated that the described arrangement provides a code division multiple access approach for allowing a large population of terminals, organized into a moderately large group of small to medium-size networks, to occupy the same inbound space segment in an essentially non-interfering manner. Each network has its own hub and operates using a slotted contention protocol on the inlink and a TDM stream in a separate channel on its outlink.

Provision is made to have distinct private networks share the same inbound space segment or radio-frequency channel. This is done by assigning each system of a network a unique nominal signature or spreading code.

Alternative code is used for the retransmission of packets lost due to either collisions in the slotted contention channel or to bit errors. This arrangement has the effect of significantly shortening the overall response time of the network compared to conventional slotted retransmission procedure of resending using the same code.

What is claimed is:

1. A communication system comprises of: A hub station; and a plurality of terminal stations, said terminal stations adapted to provide an inbound communication link from each of said terminal stations to said hub station for sending digital data packets encoded with a CDMA code for code division multiple access during synchronized time slots on a contention channel, each of said digital data packets encoded with the same CDMA code during a first transmission, said terminal stations provided with CDMA code means for pseudo-randomly selecting from a pool of alternative CDMA codes for encoding each packet with an alternate CDMA code during any subsequent transmission.

* * * * *